(12) United States Patent
Mu

(10) Patent No.: US 12,500,700 B2
(45) Date of Patent: Dec. 16, 2025

(54) METHOD FOR COMMUNICATION, APPARATUS FOR COMMUNICATION AND NON-TRANSITORY COMPUTER-READABLE STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 374 days.

(21) Appl. No.: 18/024,747

(22) PCT Filed: Sep. 4, 2020

(86) PCT No.: PCT/CN2020/113623
§ 371 (c)(1),
(2) Date: Mar. 3, 2023

(87) PCT Pub. No.: WO2022/047754
PCT Pub. Date: Mar. 10, 2022

(65) Prior Publication Data
US 2023/0396369 A1      Dec. 7, 2023

(51) Int. Cl.
*H04L 1/1829*        (2023.01)

(52) U.S. Cl.
CPC .................................. *H04L 1/1854* (2013.01)

(58) Field of Classification Search
CPC ... H04L 1/1854; H04L 1/1822; H04L 1/1896; H04L 1/1671; H04L 1/1812
(Continued)

(56) References Cited

U.S. PATENT DOCUMENTS

2015/0009897 A1   1/2015  Wilhelmsson et al.
2019/0296863 A1*  9/2019  Hu ........................ H04W 72/23
(Continued)

FOREIGN PATENT DOCUMENTS

CN    108289015 A    7/2018
CN    109451798 A    3/2019
(Continued)

OTHER PUBLICATIONS

International Search Report of PCT/CN2020/113623 dated Jun. 4, 2021, with English translation, (5p).
(Continued)

*Primary Examiner* — Candal Elpenord
(74) *Attorney, Agent, or Firm* — Arch & Lake LLP; Hao Tan; Shen Wang

(57) ABSTRACT

A method for communication, applied to a terminal, including: determining, in response to the terminal being configured with a first transmission configuration, a hybrid automatic repeat request feedback delay set; wherein the hybrid automatic repeat request feedback delay set comprises at least one candidate hybrid automatic repeat request feedback delay; and determining a hybrid automatic repeat request feedback delay corresponding to the first transmission configuration based on the hybrid automatic repeat request feedback delay set; where the first transmission configuration is a first number of hybrid automatic repeat request process or a transmission configuration associated with a first number of hybrid automatic repeat request.

16 Claims, 3 Drawing Sheets

(58) Field of Classification Search
USPC .................................................. 370/329–330
See application file for complete search history.

(56) References Cited

U.S. PATENT DOCUMENTS

| | | |
|---|---|---|
| 2019/0363840 A1 | 11/2019 | Wang et al. |
| 2020/0052824 A1 | 2/2020 | Bienas et al. |
| 2021/0029719 A1* | 1/2021 | Zhou ...................... H04L 5/0055 |
| 2022/0231820 A1* | 7/2022 | Zaki ....................... H04L 1/1896 |
| 2022/0248436 A1* | 8/2022 | Zhang ................ H04W 72/1273 |
| 2023/0106098 A1* | 4/2023 | Wang .................... H04L 1/1854 |
| | | 370/329 |
| 2023/0143786 A1* | 5/2023 | Dimou .................. H04L 1/1867 |
| | | 370/329 |

FOREIGN PATENT DOCUMENTS

| | | |
|---|---|---|
| CN | 110326240 A | 10/2019 |
| CN | 112219367 A | 1/2021 |

OTHER PUBLICATIONS

Qualcomm Incorporated, "Enhancements to Scheduling and HARQ operation for NR-U", 3GPP TSG RAN WG1 Meeting #97 R1-1907263 Reno, US, May 13-May 17, 2019, (12p).

* cited by examiner

METHOD FOR COMMUNICATION, APPARATUS FOR COMMUNICATION AND NON-TRANSITORY COMPUTER-READABLE STORAGE MEDIUM

CROSS-REFERENCE TO RELATED APPLICATION

The present application is a U.S. National Stage of International Application No. PCT/CN2020/113623, filed on Sep. 4, 2020, the entire content of which is incorporated herein by reference for all purposes.

TECHNICAL FIELD

The present disclosure relates to the technical field of wireless communication, and in particular, to a method for communication, an apparatus for communication, and a storage medium.

BACKGROUND

In a communication technology system, the development of the Internet of Things is more convenient for human life and work. Among them, the Machine Type Communication (MTC) technology is a typical representation of a cellular Internet of Things technology. Currently, MTC has been widely used in: smart cities, such as meter reading; smart agriculture, such as collection of information such as temperature and humidity; smart transportation, such as shared bicycles.

SUMMARY

According to a first aspect of the present disclosure, there is provided a method for communication, applied to a terminal, including:
  determining, in response to the terminal being configured with a first transmission configuration, a hybrid automatic repeat request feedback delay set; where the hybrid automatic repeat request feedback delay set includes at least one candidate hybrid automatic repeat request feedback delay; and determining a hybrid automatic repeat request feedback delay corresponding to the first transmission configuration based on the hybrid automatic repeat request feedback delay set; where the first transmission configuration is a first number of hybrid automatic repeat request process or a transmission configuration associated with a first number of hybrid automatic repeat request.

According to another aspect of the present disclosure, there is provided an apparatus for communication, including:
  a processor; and a memory configured to store with an instruction executable by the processor; where the processor is configured to perform the method for communication according to any embodiment of the first aspect or the first aspect.

According to another aspect of the present disclosure, there is provided a non-transitory computer-readable storage medium, and when an instruction in the storage medium is executed by a processor of a terminal, the terminal is enabled to perform the method for communication according to any embodiment of the first aspect or the first aspect.

BRIEF DESCRIPTION OF THE DRAWINGS

The accompanying drawings, which are incorporated in and constitute a part of the description, illustrate embodiments consistent with the present disclosure and, together with the description, serve to explain the principles of the present disclosure.

DETAILED DESCRIPTION

Figure 1:
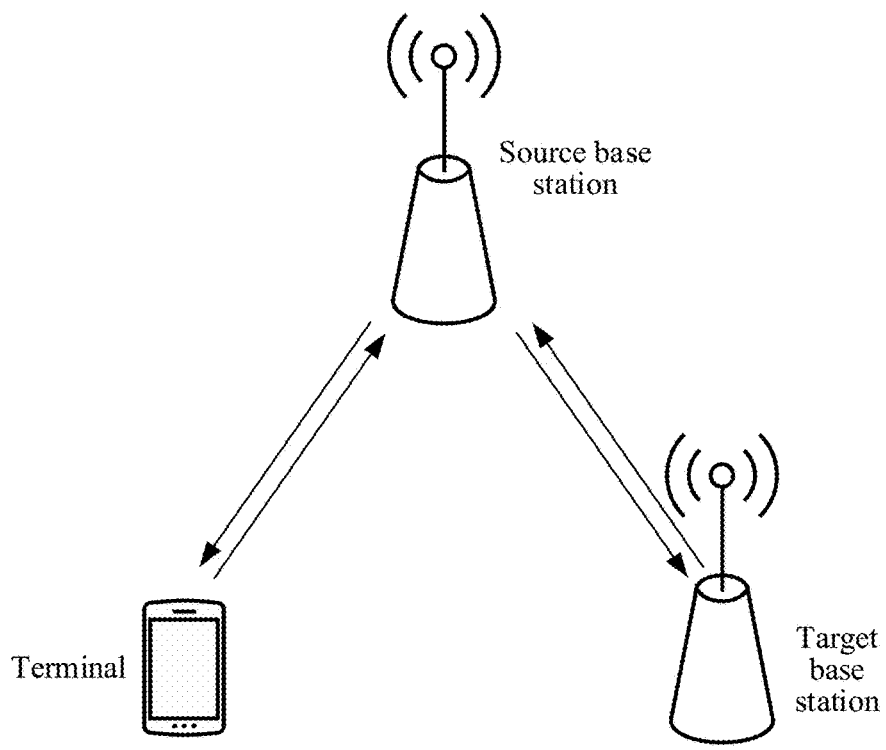
FIG. 1 is a schematic diagram of a communication system architecture of a network device and a terminal according to an embodiment.

Example embodiments will be described in detail here, examples of which are illustrated in the accompanying drawings. The following description refers to the accompanying drawings in which the same numbers in different drawings represent the same or similar elements unless otherwise represented. The embodiments described in the following example embodiments do not represent all embodiments consistent with the present disclosure. Rather, they are examples of apparatuses and methods consistent with some aspects of the present disclosure as detailed in the appended claims.

In recent years, due to the development of the Internet of Things, much convenience is brought to human life and work. The machine type communication (MTC) technology is a typical representation of a cellular Internet of Things technology. Currently, MTC has been widely used in: smart cities, such as meter reading; smart agriculture, such as collection of information such as temperature and humidity; smart transportation, such as shared bicycles.

However, since most of the MTC application scenarios are those that do not need high communication capability, such as data collection, and that the cost of the MTC terminal is low, the processing capability of the MTC terminal relative to other terminals is also greatly reduced. Moreover, according to the power saving characteristic of the MTC terminal, most of the MTC terminals are deployed in scenarios where the battery is not easily charged or the battery is not easily replaced, for example, in a scenario such as a field or a basement.

In the related art, the MTC terminal includes a half duplex frequency division duplexing (HD-FDD) MTC terminal, and the HD-FDD MTC terminal is a half-duplex MTC terminal. Specifically, at a certain moment, the HD-FDD MTC terminal can send data or receive data, and the terminal does not support sending or receiving data at the same time.

In an MTC system, a more flexible and dynamic hybrid automatic repeat request feedback delay (HARQ feedback delay) may also be supported, where HARQ is a hybrid automatic repeat request. When the MTC terminal is configured with scheduling enhancement of ce-SchedulingEnhancement, a dynamic hybrid automatic repeat request feedback delay may be used. Among them, when the terminal is configured with scheduling enhancement of ce-SchedulingEnhancement, more than one different hybrid automatic repeat request dynamic delay set can be defined, as well as the corresponding information domains of the delay elements in more than one different hybrid automatic repeat request dynamic delay set in the paging downlink control information. Referring to Table 1, two hybrid automatic repeat request dynamic delay sets being defined and each hybrid automatic repeat request dynamic delay set including eight delay elements are taken as an example to illustrate. As shown in Table 1, each delay element included in each hybrid automatic repeat request dynamic delay set corresponds to an information domain in paging downlink control information.

TABLE 1

| Information domain corresponding to hybrid automatic repeat request dynamic delay in paging downlink control information | Defined hybrid automatic repeat request dynamic delay set 1, whethe terminal is configured with scheduling enhancement of ce-SchedulingEnhancement | Defined hybrid automatic repeat request dynamic delay set, when the terminal is configured with scheduling enhancement of ce-Scheduling Enhancement |
|---|---|---|
| 000 | 4 | 4 |
| 001 | 5 | 5 |
| 010 | 7 | 6 |
| 011 | 9 | 7 |
| 100 | 11 | 8 |
| 101 | 13 | 9 |
| 110 | 15 | 10 |
| 111 | 17 | 11 |

However, some related functions are added to the published 17 version HD-FDD MTC terminal, where one related function is to support an additional scheduling delay so as to support the maximum 14 hybrid automatic repeat request processes (HARQ processes). Therefore, when the HD-FDD MTC terminal (which may also be referred to as an MTC terminal) needs to support the maximum 14 hybrid automatic repeat request process es (HARQ processes), the fixed 4 ms of hybrid automatic repeat request HARQ feedback delay in the related art cannot satisfy the needs, and more flexible hybrid automatic repeat request HARQ feedback delay needs to be supported.

In view of the above, more flexible and dynamic Hybrid Automatic Repeat Request Feedback Delay (HARQ Feedback Delay) may be supported in the MTC system of the related art. However, a dynamic hybrid automatic repeat request feedback delay may be used when the MTC terminal is configured with the "ce-SchedulingEnhancement", which cannot satisfy the feedback delay needed when the HD-FDD MTC terminal needs to support the maximum 14 HARQ processes. Therefore, when the HD-FDD MTC terminal needs to support the maximum 14 HARQ processes, a more flexible and dynamic hybrid automatic repeat request feedback delay is needed.

Based on the technical problems involved in related art, there is provided a method for communication according to the present disclosure. FIG. 1 is a schematic diagram of a communication system architecture of a network device and a terminal according to an embodiment. The method for communication provided in the present disclosure may be applied to FIG. 1. As shown in FIG. 1, the network side device sends an indication message for configuring functions and the hybrid automatic repeat request feedback delay set for the terminal, and the terminal receives the indication message of the network side device to determine the configured functions and the hybrid automatic repeat request feedback delay set. By configuring the hybrid automatic repeat request feedback delay set, a corresponding dynamic delay element can be used when the terminal supports a specified function, so that the terminal supports a more flexible delay element.

It may be understood that the communication system between the network device and the terminal shown in FIG. 1 is illustrative, and the wireless communication system may further include other network devices, for example, may further include a core network device, a wireless relay device, a wireless backhaul device, and the like, and is not shown in FIG. 1. In some embodiments of the present disclosure, the number of network devices and the number of terminals included in the wireless communication system are not limited.

It can be further understood that, the wireless communication system according to some embodiments of the present disclosure is a network for providing a wireless communication function. The wireless communication system may adopt different communication technologies, such as code division multiple access (CDMA), wideband code division multiple access (WCDMA), time division multiple access (TDMA), frequency division multiple access (FDMA), orthogonal frequency-division multiple access (OFDMA), single carrier frequency division multiple access (SC-FDMA), carrier sense multiple access with collision avoidance. according to the capacity, rate, delay and other factors of different networks, the networks may be divided into a 2G (generation) network, a 3G network, a 4G network, or a future evolution network, for example, a 5G network, which may also be referred to as a new radio (NR) network. For ease of description, the present disclosure sometimes simply short the wireless communication network as a network.

Furthermore, the network device involved in the present disclosure may also be referred to as a wireless access network device. The wireless access network device may be: a base station, an evolved base station (evolved Node B), a home base station, an access point (AP) in a wireless fidelity (WiFi) system, a wireless relay node, a wireless backhaul node, a transmission point (TP) or a transmission and reception point (TRP), etc., or may be a gNB in an NR system. It may also be a component or a part of devices that constitutes a base station. When it is an Internet of Vehicles (V2X) communication system, the network device may also be a vehicle-mounted device. It should be understood that, in some embodiments of the present disclosure, the specific technology used for the network device and the specific device form are not limited.

Furthermore, the terminal involved in the present disclosure may also be referred to as a terminal device, a user equipment (UE), a mobile station (MS), a mobile terminal (MT), etc., and is a device for providing voice and/or data connectivity to a user, for example, the terminal may be a handheld device or a vehicle-mounted device, etc., with a wireless connection function. Currently, some examples of the terminal include: a mobile phone, a pocket computer (PPC), a palm computer, a personal digital assistant (PDA), a notebook computer, a tablet computer, a wearable device, or a vehicle-mounted device. In addition, when it is an Internet of Vehicles (V2X) communication system, the terminal device may also be a vehicle-mounted device. It should be understood that, in some embodiments of the present disclosure, the specific technology used for the network device and the specific device form are not limited.

According to the above embodiments, it can be seen that some embodiments of the present disclosure provide a method for communication.

Figure 2:
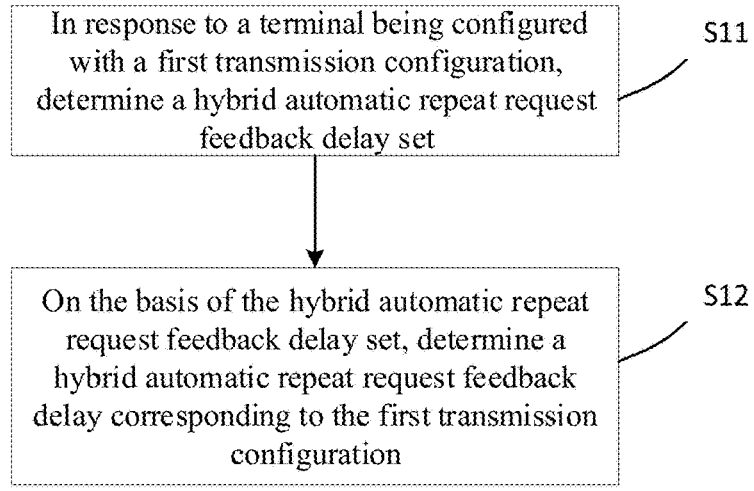
FIG. 2 is a flowchart of a method for communication according to an embodiment.

FIG. 2 is a flowchart of a method for communication according to an embodiment. As shown in FIG. 2, the method for communication is applied in a terminal, and includes the following steps.

In step S11, in response to the terminal being configured with a first transmission configuration, a hybrid automatic repeat request feedback delay set is determined.

Among them, the hybrid automatic repeat request feedback delay set includes at least one candidate hybrid automatic repeat request feedback delay. The first transmission configuration is a first number of hybrid automatic repeat request processes or a transmission configuration associated with a first number of hybrid automatic repeat requests.

In the embodiment of the present disclosure, the network side device may define more than one different hybrid automatic repeat request feedback delay set based on the first transmission configuration, and then implement use of dynamic hybrid automatic repeat request feedback delay based on more than one different hybrid automatic repeat request feedback delay set. When the terminal supports the first transmission configuration, the network side device indicates, by sending a signaling message, the hybrid automatic repeat request feedback delay set that should be used when the terminal supports the first transmission configuration.

The terminal receives the indication message sent by the network side device for configuring the first transmission configuration and determines to configure the first transmission configuration. When the terminal receives a message sent by the network side device indicating the hybrid automatic repeat request feedback delay set supported by the terminal, in response to the terminal being configured with the first transmission configuration, a hybrid automatic repeat request feedback delay set is determined according to the received indication message.

In another embodiment of the present disclosure, the network side device may further determine, by means of a communication protocol, corresponding more than one different hybrid automatic repeat request feedback delay set based on the first transmission configuration, so as to implement use of dynamic hybrid automatic repeat request feedback delay based on more than one different hybrid automatic repeat request feedback delay set. When the terminal supports the first transmission configuration, the network side device and the terminal determine, by means of a communication protocol, a hybrid automatic repeat request feedback delay set correspondingly used when the terminal supports the first transmission configuration.

In the embodiment of the present disclosure, the first number of hybrid automatic repeat request processes may be 14 hybrid automatic repeat request processes, and the first number of hybrid automatic repeat requests may be 14 hybrid automatic repeat requests.

In step S12, a hybrid automatic repeat request feedback delay corresponding to the first transmission configuration is determined based on the hybrid automatic repeat request feedback delay set.

In the embodiment of the present disclosure, the network side device indicates, by sending the downlink control information, the hybrid automatic repeat request feedback delay in the used hybrid automatic repeat request feedback delay set supported by the terminal. Among them, the downlink control information informs the terminal of the hybrid automatic repeat request feedback delay used when the first number of hybrid automatic repeat request processes are supported, by indicating the information domain corresponding to the supported hybrid automatic repeat request feedback delay.

In some embodiments of the present disclosure, when defining each hybrid automatic repeat request feedback delay in the hybrid automatic repeat request feedback delay set, the network side device may adopt a manner of using an information domain in the downlink control information to indicate a hybrid automatic repeat request feedback delay supported by the terminal by means of a bit included in the information domain. If the information domain used in the downlink control information is the first information domain, it can be indicated that the number of candidate hybrid automatic repeat request feedback delay included in the hybrid automatic repeat request feedback delay set corresponding to the hybrid automatic repeat request feedback delay supported by the terminal may is less than the first threshold. For example, the first threshold may be eight candidate hybrid automatic repeat request feedback delays, and the information domain used in the downlink control information is the first information domain, then it is determined to indicate that the number of candidate hybrid automatic repeat request feedback delay included in the hybrid automatic repeat request feedback delay set corresponding to the hybrid automatic repeat request feedback delay supported by the terminal is less than the first threshold (where less than 8 candidate hybrid automatic repeat request feedback delays may be selected as needed). Among them, the first information domain may include three bits (for example, the information domain is 000, and 000 indicates that the corresponding hybrid automatic repeat request feedback delay supported by the terminal is 4).

The terminal receives the downlink control information sent by the network side device. In response to the number of candidate hybrid automatic repeat request feedback delay included in the hybrid automatic repeat request feedback delay set being less than a first threshold and determining that the information domain used for indicating the hybrid automatic repeat request feedback delay supported by the terminal in the downlink control information is the first information domain, then the hybrid automatic repeat request feedback delay corresponding to the hybrid automatic repeat request process is indicated through the first information domain of the downlink control information.

In some embodiments of the present disclosure, when defining each hybrid automatic repeat request feedback delay in the hybrid automatic repeat request feedback delay set, the network side device may adopt a manner of using an information domain in the downlink control information to indicate a hybrid automatic repeat request feedback delay supported by the terminal by means of a bit included in the information domain. If the information domain used in the downlink control information is the first information domain, it indicates that the number of candidate hybrid automatic repeat request feedback delay included in the hybrid automatic repeat request feedback delay set supported by the terminal may be equal to the first threshold. For example, the first threshold may be eight candidate hybrid automatic repeat request feedback delays (where, the eight candidate hybrid automatic repeat request feedback delays may be selected as needed), and the information domain used in the downlink control information is the first information domain, then it is determined to indicate that the number of candidate hybrid automatic repeat request feedback delay included in the hybrid automatic repeat request feedback delay set supported by the terminal is equal to the first threshold. Among them, the first information domain may include three bits.

The terminal receives the downlink control information sent by the network side device. In response to the number of the candidate hybrid automatic repeat request feedback delay included in the hybrid automatic repeat request feedback delay set being equal to the first threshold and determining that the information domain used for indicating the hybrid automatic repeat request feedback delay supported by the terminal in the downlink control information is the first information domain, then the hybrid automatic repeat request feedback delay corresponding to the hybrid automatic repeat request process is indicated through the first information domain of the downlink control information.

As shown in Table 2 below, an embodiment of the present disclosure proposes a method for communication, which indicates eight or any number of candidate scheduling delay values by means of a first field domain (for example, 3 bits or more than 3 bits) of DCI. With reference to Table 2, different values of the first field domain correspond to different hybrid automatic repeat request feedback delay values. The corresponding relationship between the first field domain shown in Table 2 and the hybrid automatic repeat request feedback delay may be determined based on a protocol, or may be determined by the network side and then sent to the terminal side, and may also be pre-stored on the terminal side.

As shown in Table 4 below, an embodiment of the present disclosure proposes a method for communication, which indicates eight or any number of candidate scheduling delay values by means of a second field domain (for example, 3 bits or more than 3 bits) of DCI. With reference to Table 2, different values of the first field domain correspond to different hybrid automatic repeat request feedback delay values. The corresponding relationship between the first field domain shown in Table 2 and the hybrid automatic repeat request feedback delay may be determined based on a protocol, or may be determined by the network side and then sent to the terminal side, and may also be pre-stored on the terminal side.

As shown in Table 4, some embodiments of the present disclosure reuse one or more hybrid automatic repeat request feedback delay sets corresponding to the scheduling enhancement function in the related art as shown in Table 3, and a column (column 4, HARQ-ACK delay value when 'ce-SchedulingEnhancement' set to 'range 3') is added. That is, in some embodiments, the information domain corresponding to the hybrid automatic repeat request feedback delay in the downlink control information ('HARQ-ACK Delay' Field in DCI) is used to indicate that the third column in Table 4 is used to indicate one or more hybrid automatic repeat request feedback delay sets (HARQ-ACK delay value when 'ce-SchedulingEnhancement' set to 'range1') corresponding to the scheduling enhancement function in the related art shown in the second column in Table 4. In some other embodiments, when the ce-SchedulingEnhancement parameter indicates range2, the information domain corresponding to the hybrid automatic repeat request feedback delay in the downlink control information ('HARQ-ACK Delay' Field in DCI) is used to indicate one or more hybrid automatic repeat request feedback delay sets (HARQ-ACK delay value when 'ce-SchedulingEnhancement' set to 'range2') corresponding to the scheduling enhancement function in the related art shown in the third column in Table 4. In still other embodiments, when the ce-SchedulingEnhancement parameter indicates Range 3, the information domain corresponding to the hybrid automatic repeat request feedback delay in the downlink control information ('HARQ-ACK Delay' Field in DCI) is used to indicate that third column in Table 4 is used to indicate one or more hybrid automatic repeat request feedback delay sets (HARQ-ACK delay value when 'ce-SchedulingEnhancement' set to 'range3') corresponding to the scheduling enhancement function in the related art shown in the fourth column in Table 4.

As shown in Table 5 below, an embodiment of the present disclosure proposes a method for communication, which indicates eight candidate scheduling delay values by means of a third field domain (for example, 3 bits or more than 3 bits) of DCI. As shown in Table 5, at least two hybrid automatic repeat request feedback delay sets may be included, for example, as shown in Table 5, a first hybrid automatic repeat request feedback delay set (HARQ-ACK delay value when 'support of 14 HARQ process' set to 'range 1') corresponding to the second column and a second hybrid automatic repeat request feedback delay set (HARQ-ACK delay value when 'support of 14 HARQ process' set to 'range2') corresponding to the third column are included. Among them, under different second parameters (support of 14 HARQ process), a value for a third field domain ('HARQ-ACK delay' field in DCI) of the first column corresponds to different hybrid automatic repeat request feedback delay values.

In the following embodiments, the hybrid automatic repeat request feedback delay set is described in the form of a table by taking the number of candidate hybrid automatic repeat request feedback delay included in the hybrid automatic repeat request feedback delay set being eight as an example. In the embodiment of the present disclosure, if the hybrid automatic repeat request feedback delay set includes 8 or less than 8 candidate hybrid automatic repeat request feedback delays, the candidate hybrid automatic repeat request feedback delay included in the hybrid automatic repeat request feedback delay set may be extracted based on more than 8 candidate hybrid automatic repeat request feedback delays. In other words, eight or less than eight candidate hybrid automatic repeat request feedback delays are extracted from more than 8 candidate hybrid automatic repeat request feedback delays to obtain a hybrid automatic repeat request feedback delay set.

Referring to Table 2, the first column of Table 2 is an information domain corresponding to each hybrid automatic repeat request feedback delay in the downlink control information. The second column in Table 2 is the candidate hybrid automatic repeat request feedback delay included in the hybrid automatic repeat request feedback delay set (where the candidate hybrid automatic repeat request feedback delay in the table is obtained according to the extraction), as shown in Table 2.

TABLE 2

| Information domain corresponding to hybrid automatic repeat request feedback delay in the downlink control information HARQ-ACK delay' field in DCI | Candidate hybrid automatic repeat request feedback delay HARQ-ACK delay value |
|---|---|
| 000 | 4 |
| 001 | 5 |
| 010 | 7 |
| 011 | 9 |
| 100 | 11 |
| 101 | 13 |
| 110 | 15 |
| 111 | 17 |

It will be appreciated that each element in Table 2 is independently present. These elements are listed in the same table as examples, but do not represent that all elements in the table must be present as shown in the table. Among them, the value of each element is independent of any other element value in Table 2. Therefore, it can be understood by those skilled in the art that the value of each element in Table 2 is an independent embodiment.

It can be understood that the specific values of each candidate hybrid automatic repeat request feedback delay (HARQ-ACK delay value) in Table 2 are for illustration and are not limited to the technical solutions of the present disclosure. A person skilled in the art may understand that, even if the specific value of the HARQ-ACK delay value is different from Table 2 in some embodiments of the present disclosure, it should also be considered conformed to the intention of some embodiments of the present disclosure, and should also be within the protection scope of the present disclosure.

In some embodiments of the present disclosure, when defining each hybrid automatic repeat request feedback delay in the hybrid automatic repeat request feedback delay set, the network side device may adopt a manner of using an information domain in the downlink control information to indicate a hybrid automatic repeat request feedback delay supported by the terminal by means of a bit included in the information domain. If the information domain used in the downlink control information is a second information domain, it indicates that the number of candidate hybrid automatic repeat request feedback delay that may be included in the hybrid automatic repeat request feedback delay set corresponding to the hybrid automatic repeat request feedback delay supported by the terminal is more than a first threshold. For example, the first threshold may be eight candidate hybrid automatic repeat request feedback delays, the information domain used in the downlink control information is the second information domain, and it is determined to indicate that the number of candidate hybrid automatic repeat request feedback delay included in the hybrid automatic repeat request feedback delay set corresponding to the hybrid automatic repeat request feedback delay supported by the terminal is more than the first threshold. For example, the hybrid automatic repeat request feedback delay set includes 14 candidate hybrid automatic repeat request feedback delays, and the range may be 4-17, where the second information domain may include four bits (for example, the information domain is 0000, and 0000 indicates that the hybrid automatic repeat request feedback delay supported by the corresponding terminal is 4).

The terminal receives the downlink control information sent by the network side device. In response to the number of the candidate hybrid automatic repeat request feedback delay included in the hybrid automatic repeat request feedback delay set being more than the first threshold and determining that the information domain used for indicating the hybrid automatic repeat request feedback delay supported by the terminal in the downlink control information is the second information domain, then the hybrid automatic repeat request feedback delay corresponding to the hybrid automatic repeat request process is indicated through the second information domain of the downlink control information.

In some embodiments of the present disclosure, when defining each hybrid automatic repeat request feedback delay in the hybrid automatic repeat request feedback delay set, the network side device may adopt a manner of using an information domain in the downlink control information to indicate a hybrid automatic repeat request feedback delay supported by the terminal by means of a bit included in the information domain. If the information domain used in the downlink control information is the second information domain, it indicates that the number of candidate hybrid automatic repeat request feedback delay that may be included in the hybrid automatic repeat request feedback delay set corresponding to the hybrid automatic repeat request feedback delay supported by the terminal is more than a first threshold. For example, the first threshold may be eight candidate hybrid automatic repeat request feedback delays (where the eight candidate hybrid automatic repeat request feedback delays may be selected as needed), and the information domain used in the downlink control information is a second information domain, and then it is determined that the number of candidate hybrid automatic repeat request feedback delay included in the hybrid automatic repeat request feedback delay set supported by the terminal is equal to the first threshold. Among them, the second information domain may include four bits (for example, the information domain is 0000, and 0000 indicates that the hybrid automatic repeat request feedback delay supported by the corresponding terminal is 4).

The terminal receives the downlink control information sent by the network side device. In response to the number of the candidate hybrid automatic repeat request feedback delay included in the hybrid automatic repeat request feedback delay set being equal to the first threshold and determining that the information domain used for indicating the hybrid automatic repeat request feedback delay supported by the terminal in the downlink control information is the second information domain, then the hybrid automatic repeat request feedback delay corresponding to the hybrid automatic repeat request process is indicated through the second information domain of the downlink control information.

In some embodiments of the present disclosure, when the terminal is configured with a first number of hybrid automatic repeat request processes, it is also needed to bind a configuration of a scheduling enhancement function of ce-SchedulingEnhancement. In the condition that the network side device defines the terminal being configured with a first number of hybrid automatic repeat request processes, and/or, in the condition that the network side device defines the terminal being bound with a configuration of a scheduling enhancement function, the network side device may reuse one or more hybrid automatic repeat request feedback delay sets predefined by release previously and corresponding to the scheduling enhancement function. In one or more hybrid automatic repeat request feedback delay sets corresponding to the scheduling enhancement function, at least one hybrid automatic repeat request feedback delay set is determined. The network side device indicates one of the hybrid automatic repeat request feedback delay sets supported by the terminal through the downlink control information. In addition, the hybrid automatic repeat request feedback delay supported by the terminal may also be indicated through the information domain in the downlink control information.

When the network side device defines the hybrid automatic repeat request feedback delay set corresponding to the terminal being configured with a first number of hybrid automatic repeat request processes and being bound with a configuration of a scheduling enhancement function, if one or more hybrid automatic repeat request feedback delay sets predefined by release previously and corresponding to the scheduling enhancement function are reused, it may refer to Table 3, for example, two hybrid automatic repeat request feedback delay sets corresponding to the scheduling enhancement function being reused. The first column of Table 3 is an information domain corresponding to each hybrid automatic repeat request feedback delay in the downlink control information, the second column of Table 3 is a hybrid automatic repeat request feedback delay set 1 reused and corresponding to the scheduling enhancement function, and the third column of Table 3 is a hybrid automatic repeat request feedback delay set 2 reused and corresponding to the scheduling enhancement function. Each hybrid automatic repeat request feedback delay set corresponding to the scheduling enhancement function includes eight candidate hybrid automatic repeat request feedback delays. Among them, the candidate hybrid automatic repeat request feedback delay included in each hybrid automatic repeat request feedback delay set is selected according to the feedback delay of the hybrid automatic repeat request supported by the terminal, as shown in Table 3.

present disclosure, and should also be within the protection scope of the present disclosure.

After receiving the downlink control information sent by the network side device, the terminal determines at least one hybrid automatic repeat request feedback delay set according to one or more hybrid automatic repeat request feedback delay sets corresponding to the scheduling enhancement function. Moreover, a supported (or used) hybrid automatic repeat request feedback delay may further be determined according to the downlink control information sent by the network side device.

In some embodiments of the present disclosure, when the terminal is configured with a first number of hybrid automatic repeat request processes, it is also needed to bind a configuration of a scheduling enhancement function of ce-SchedulingEnhancement. When the network side device defines the hybrid automatic repeat request feedback delay set corresponding to the terminal being configured with a first number of hybrid automatic repeat request processes and being bound with a configuration of a scheduling enhancement function, one or more hybrid automatic repeat request feedback delay predefined by release previously and corresponding to the scheduling enhancement function may be reused. In one or more hybrid automatic repeat request feedback delays corresponding to the scheduling enhancement function, at least one hybrid automatic repeat request feedback delay is selected as a candidate hybrid automatic repeat request feedback delay when the terminal is configured with a first number of hybrid automatic repeat request processes and is bound with a configuration of a scheduling enhancement function. Furthermore, at least one hybrid automatic repeat request feedback delay set is to determined

TABLE 3

| Information domain corresponding to hybrid automatic repeat request feedback delay in the downlink control information HARQ-ACK delay' field in DCI | Hybrid automatic repeat request feedback delay set 1 corresponding to scheduling enhancement function HARQ-ACK delay value when 'ce-SchedulingEnhancement' set to 'range1' | Hybrid automatic repeat request feedback delay set 2 corresponding to scheduling enhancement function HARQ-ACK delay value when 'ce-SchedulingEnhancement' set to 'range2' |
|---|---|---|
| 000 | 4 | 4 |
| 001 | 5 | 5 |
| 010 | 7 | 6 |
| 011 | 9 | 7 |
| 100 | 11 | 8 |
| 101 | 13 | 9 |
| 110 | 15 | 10 |
| 111 | 17 | 11 |

It will be appreciated that each element in Table 3 is independently present. These elements are listed in the same table as examples, but do not represent that all elements in the table must be present as shown in the table. Among them, the value of each element is independent on any other element value in Table 3. Therefore, it can be understood by those skilled in the art that the value of each element in Table 3 is an independent embodiment.

It can be understood that the specific values of each candidate hybrid automatic repeat request feedback delay (HARQ-ACK delay value) in each of the sets in Table 3 are for illustration and are not limited to the technical solutions of the present disclosure. A person skilled in the art may understand that, even if the specific value of the HARQ-ACK delay value is different from Table 3 in some embodiments of the present disclosure, it should also be considered conformed to the intention of some embodiments of the according to the selected at least one hybrid automatic repeat request feedback delay as a candidate hybrid automatic repeat request feedback delay when the terminal is configured with a first number of hybrid automatic repeat request processes and is bound with a configuration of a scheduling enhancement function. The network side device indicates one of the hybrid automatic repeat request feedback delay sets supported by the terminal through the downlink control information. In addition, the hybrid automatic repeat request feedback delay supported by the terminal may also be indicated through the information domain in the downlink control information.

After receiving the downlink control information sent by the network side device, the terminal determines at least one hybrid automatic repeat request feedback delay set according to one or more hybrid automatic repeat request feedback delay sets corresponding to the scheduling enhancement function. Moreover, a supported (or used) hybrid automatic repeat request feedback delay may be may further determined according to the downlink control information sent by the network side device.

In some embodiments of the present disclosure, when the terminal is configured with a first number of hybrid automatic repeat request processes, it is also needed to bind a configuration of a scheduling enhancement function of ce-SchedulingEnhancement. When the network side device defines the hybrid automatic repeat request feedback delay set corresponding to the terminal being configured with a first number of hybrid automatic repeat request processes and being bound with a configuration of a scheduling enhancement function, one or more hybrid automatic repeat request feedback delay sets predefined by release previously and corresponding to the scheduling enhancement function may be reused. In one or more hybrid automatic repeat request feedback delay sets corresponding to the scheduling enhancement function, at least one hybrid automatic repeat request feedback delay set is determined. The network side device indicates one of the hybrid automatic repeat request feedback delay sets supported by the terminal through the downlink control information, and may also indicate the hybrid automatic repeat request feedback delay supported by function are reused, and a hybrid automatic repeat request feedback delay set defined for a specified number of hybrid automatic repeat request feedback functions is added. The first column of Table 3 is an information domain corresponding to each hybrid automatic repeat request feedback delay in downlink control information, the second column of Table 4 is a hybrid automatic repeat request feedback delay set 1 reused and corresponding to the scheduling enhancement function, the third column of Table 4 is a hybrid automatic repeat request feedback delay set 2 reused and corresponding to the scheduling enhancement function, and the fourth column of Table 4 is a hybrid automatic repeat request feedback delay set defined for a specified number of hybrid automatic repeat request feedback functions corresponding to the scheduling enhancement function and is a hybrid automatic repeat request feedback delay set 3 corresponding to the scheduling enhancement function. In addition, each hybrid automatic repeat request feedback delay set corresponding to the scheduling enhancement function includes eight candidate hybrid automatic repeat request feedback delay. Among them, the candidate hybrid automatic repeat request feedback delay included in each hybrid automatic repeat request feedback delay set is selected according to the hybrid automatic repeat request feedback delay supported by the terminal, as shown in Table 4.

TABLE 4

| Information domain corresponding to hybrid automatic repeat request feedback delay in the downlink control information 'HARQ-ACK delay' field in DCI | Hybrid automatic repeat request feedback delay set 1 corresponding to scheduling enhancement function HARQ-ACK delay value when 'ce-SchedulingEnhancement' set to 'range1' | Hybrid automatic repeat request feedback delay set 2 corresponding to scheduling enhancement function HARQ-ACK delay value when 'ce-SchedulingEnhancement' set to 'range2' | Hybrid automatic repeat request feedback delay set 3 corresponding to scheduling enhancement function HARQ-ACK delay value When 'ce-SchedulingEnhancement' set to 'range3' |
|---|---|---|---|
| 000 | 4 | 4 | 8 |
| 001 | 5 | 5 | 9 |
| 010 | 7 | 6 | 10 |
| 011 | 9 | 7 | 11 |
| 100 | 11 | 8 | 12 |
| 101 | 13 | 9 | 13 |
| 110 | 15 | 10 | 14 |
| 111 | 17 | 11 | 15 | the terminal through the information domain in the downlink control information. One or more hybrid automatic repeat request feedback delay sets may be further be defined for a specified number of hybrid automatic repeat request feedback functions. For example, the specified number of hybrid automatic repeat request feedback may be 14 hybrid automatic repeat request feedback (14 HARQ feedback), and one or more hybrid automatic repeat request feedback delay sets are defined for 14 hybrid automatic repeat request feedback.

When the network side device defines the hybrid automatic repeat request feedback delay set corresponding to the terminal being configured with a first number of hybrid automatic repeat request processes and being bound with a configuration of a scheduling enhancement function, if one or more hybrid automatic repeat request feedback delay sets predefined by release previously and corresponding to the scheduling enhancement function are reused, one or more hybrid automatic repeat request feedback delay sets defined for the specified number of hybrid automatic repeat request feedback functions may also be added. Referring to Table 4, for example, two hybrid automatic repeat request feedback delay sets corresponding to the scheduling enhancement It will be appreciated that each element in Table 4 is independently present. These elements are listed in the same table as examples, but do not represent that all elements in the table must be present as shown in the table. Among them, the value of each element is independent of any other element value in Table 4. Therefore, it can be understood by those skilled in the art that the value of each element in Table 4 is an independent embodiment.

After receiving the downlink control information sent by the network side device, the terminal determines at least one hybrid automatic repeat request feedback delay set according to one or more hybrid automatic repeat request feedback delay sets corresponding to the scheduling enhancement function. Moreover, a supported (or used) hybrid automatic repeat request feedback delay may further be determined according to the downlink control information sent by the network side device.

In some embodiments of the present disclosure, when the terminal is configured with a first number of hybrid automatic repeat request processes, it is also needed to bind a configuration of a scheduling enhancement function of ce-SchedulingEnhancement. When the network side device defines the hybrid automatic repeat request feedback delay set corresponding to the terminal being configured with a first number of hybrid automatic repeat request processes and being bound with a configuration of a scheduling enhancement function, one or more hybrid automatic repeat request feedback delay predefined by release previously and corresponding to the scheduling enhancement function may be reused. In one or more hybrid automatic repeat request feedback delays corresponding to the scheduling enhancement function, at least one hybrid automatic repeat request feedback delay is selected as a candidate hybrid automatic repeat request feedback delay when the terminal is configured with a first number of hybrid automatic repeat request processes and is bound with a configuration of a scheduling enhancement function. Furthermore, at least one hybrid automatic repeat request feedback delay set is to determined according to the selected at least one hybrid automatic repeat request feedback delay as a candidate hybrid automatic repeat request feedback delay when the terminal is configured with a first number of hybrid automatic repeat request processes and is bound with a configuration of a scheduling enhancement function. The network side device indicates one of the hybrid automatic repeat request feedback delay sets supported by the terminal through the downlink control information, and may also indicate the hybrid automatic repeat request feedback delay supported by the terminal through the information domain in the downlink control information. One or more hybrid automatic repeat request feedback delay sets may also be defined for a specified number of hybrid automatic repeat request feedback functions. For example, the specified number of hybrid automatic repeat request feedback may be 14 hybrid automatic repeat request feedback (14 HARQ feedback), and one or more hybrid automatic repeat request feedback delay sets are defined for 14 hybrid automatic repeat request feedback.

After receiving the downlink control information sent by the network side device, the terminal determines at least one hybrid automatic repeat request feedback delay set according to one or more hybrid automatic repeat request feedback delay sets corresponding to the scheduling enhancement function. Moreover, a supported (or used) hybrid automatic repeat request feedback delay may be may further determined according to the downlink control information sent by the network side device.

In some embodiments of the present disclosure, it can be defined that there are more than one hybrid automatic repeat request feedback delay set, where more than one different hybrid automatic repeat request feedback delay set is completely different or not exactly the same.

In the embodiment of the present disclosure, more than one different hybrid automatic repeat request feedback delay set is completely different, which can be understood as that, the defined hybrid automatic repeat request feedback delay set includes a same number of hybrid automatic repeat request feedback delays, and the hybrid automatic repeat request feedback delay set includes completely different hybrid automatic repeat request feedback delays. Alternatively, it may be understood as that, the defined hybrid automatic repeat request feedback delay set includes a different number of hybrid automatic repeat request feedback delays, and the hybrid automatic repeat request feedback delay set includes completely different hybrid automatic repeat request feedback delays.

In the embodiment of the present disclosure, more than one different hybrid automatic repeat request feedback delay set is not exactly the same, which can be understood as that, the defined hybrid automatic repeat request feedback delay set includes a same number of hybrid automatic repeat request feedback delays, and the hybrid automatic repeat request feedback delay set includes partially the same hybrid automatic repeat request feedback delays, or, it is understood as that, the hybrid automatic repeat request feedback delay set includes at least one different hybrid automatic repeat request feedback delay. It may also be understood as that, the defined hybrid automatic repeat request feedback delay set includes a different number of hybrid automatic repeat request feedback delays, and the hybrid automatic repeat request feedback delay set includes partially the same hybrid automatic repeat request feedback delays. or, it is understood as that the hybrid automatic repeat request feedback delay set includes at least one different hybrid automatic repeat request feedback delay.

In some embodiments of the present disclosure, more than one different hybrid automatic repeat request feedback delay set is configured by the network side device, or determined based on the pre-configuration information, or determined based on the communication protocol, or determined by negotiation between the base station and the UE.

For example, when the terminal is configured with a first number of hybrid automatic repeat request processes, a hybrid automatic repeat request binding is further needed to be configured and used. Then, a hybrid automatic repeat request feedback delay set corresponding to the hybrid automatic repeat request binding may be reused according to the hybrid automatic repeat request binding, and a hybrid automatic repeat request feedback delay set supported by the terminal is determined by means of the pre-configuration information, and then the hybrid automatic repeat request feedback delay supported by the terminal is indicated by means of the downlink control information.

Among them, when the terminal is configured with a first number of hybrid automatic repeat request processes, a hybrid automatic repeat request binding is further needed to be configured and used, then the hybrid automatic repeat request feedback delay set supported (or used) when the terminal is configured to use the hybrid automatic repeat request binding is different from the hybrid automatic repeat request feedback delay set supported (or used) when the terminal is not configured to use the hybrid automatic repeat request binding.

In the following, the number of the defined hybrid automatic repeat request feedback delay set being two and each of the two defined hybrid automatic repeat request feedback delay set including 8 hybrid automatic repeat request feedback delay are taken as examples to illustrate in the form of tables. Referring to Table 5, the first column in Table 5 is an information domain corresponding to a hybrid automatic repeat request feedback delay in downlink control information, the second column is a hybrid automatic repeat request feedback delay set 1 defined by a terminal configured to use a first transmission configuration for a first number of hybrid automatic repeat request processes (e.g., 14 hybrid automatic repeat request processes), and the third column is a hybrid automatic repeat request feedback delay set 2 defined by a terminal configured to use a first transmission configuration for a first number of hybrid automatic repeat request processes (e.g., 14 hybrid automatic repeat request processes), as shown in Table 5.

TABLE 5

| Information domain corresponding to hybrid automatic repeat request feedback delay in the downlink control information 'HARQ-ACK delay' field in DCI | Hybrid automatic repeat request feedback delay set 1 defined by a terminal configured to use "4 hybrid automatic repeat request processes" HARQ-ACK delay value when 'support of 14 HARQ process' set to 'range' | Hybrid automatic repeat request feedback delay set 2 defined by a terminal configured to use "14 hybrid automatic repeat request processes" HARQ-ACK delay value when 'support of 14 HARQ process' set to 'range2' |
|---|---|---|
| 000 | 4 | 8 |
| 001 | 5 | 9 |
| 010 | 7 | 10 |
| 011 | 9 | 11 |
| 100 | 11 | 12 |
| 101 | 13 | 13 |
| 110 | 15 | 14 |
| 111 | 17 | 15 |

Among them, the hybrid automatic repeat request feedback delay included in each hybrid automatic repeat request feedback delay set in Table 5 above may be an extracted hybrid automatic repeat request feedback delay that may be supported by the terminal, for example, it may be referred to the hybrid automatic repeat request feedback delay included in the hybrid automatic repeat request feedback delay set 2 defined in Table 5. It may also be a range. For example, referring to Table 5, the range of the hybrid automatic repeat request feedback delay included in the hybrid automatic repeat request feedback delay set 2 defined by terminal configured to use 14 hybrid automatic repeat request processes is 8-15, and it may also be another range, which is not specifically limited here.

It will be appreciated that each element in Table 5 is independently present. These elements are listed in the same table as examples, but do not represent that all elements in the table must be present as shown in the table. The value of each element is not dependent on any other element value in Table 5. Therefore, it can be understood by those skilled in the art that the value of each element in Table 5 is an independent embodiment.

In some embodiments of the present disclosure, more than one different hybrid automatic repeat request feedback delay set is configured by the network side device, or determined based on the pre-configuration information, or determined based on the communication protocol, or determined by negotiation between the base station and the UE.

For example, when the terminal is configured with a first number of hybrid automatic repeat request processes (for example, 14 hybrid automatic repeat request processes), a hybrid automatic repeat request binding function needs to be further configured, and then it is determined that the terminal uses a hybrid automatic repeat request feedback delay set corresponding to the hybrid automatic repeat request binding function. The terminal determines a supported hybrid automatic repeat request feedback delay set based on the pre-configuration information, and indicates, by means of the received downlink control information, that the supported hybrid automatic repeat request feedback delay is determined.

Among them, when the terminal is configured with a first number of hybrid automatic repeat request processes, a hybrid automatic repeat request binding needs to be further configured to use. The determined hybrid automatic repeat request feedback delay set supported by the terminal is different from the hybrid automatic repeat request feedback delay set supported by the terminal when the terminal is not configured to use the hybrid automatic repeat request binding. In other words, the defined hybrid automatic repeat request feedback delay set when the terminal is configured with a first number of hybrid automatic repeat request processes and the hybrid automatic repeat request binding needs to be further configured to use, is different from the defined hybrid automatic repeat request feedback delay set when the terminal is configured with a first number of hybrid automatic repeat request processes.

Based on the same concept, there is further provided an apparatus for communication according to embodiments of the present disclosure.

It may be understood that, in order to implement the foregoing functions, the apparatus for communication provided in some embodiments of the present disclosure includes a hardware structure and/or a software module corresponding to performing each function. With reference to the units and algorithm steps of the examples disclosed in some embodiments of the present disclosure, some embodiments of the present disclosure can be implemented in the form of hardware or a combination of hardware and computer software. Whether a function is implemented in the way of hardware or computer software driving hardware depends on the specific application and design constraints of the technical solution. Those skilled in the art can use different methods to achieve the described functions for each specific application, but such implementation should not be considered beyond the scope of the technical solution of some embodiments of the present disclosure.

Figure 3:
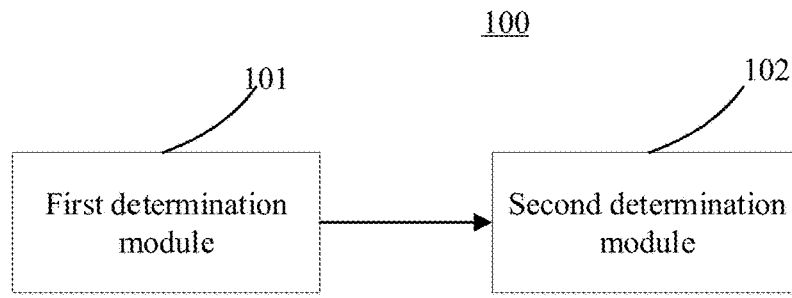
FIG. 3 is a block diagram of an apparatus for communication according to an embodiment.

FIG. 3 is a block diagram of an apparatus for communication 100 according to an embodiment. Referring to FIG. 3, the apparatus includes a first determination module 101 and a second determination module 102

The first determination module 101 is configured to determine a hybrid automatic repeat request feedback delay set in response to the terminal being configured with a first transmission configuration. The hybrid automatic repeat request feedback delay set includes at least one candidate hybrid automatic repeat request feedback delay. The second determination module 102 is configured to determine a hybrid automatic repeat request feedback delay corresponding to the first transmission configuration based on the hybrid automatic repeat request feedback delay set, where the first transmission configuration is a first number of hybrid automatic repeat request processes or a transmission configuration associated with the first number of hybrid automatic repeat requests.

In the embodiment of the present disclosure, in response to a number of candidate hybrid automatic repeat request feedback delay included in the hybrid automatic repeat request feedback delay set being less than a first threshold, a hybrid automatic repeat request feedback delay corresponding to a hybrid automatic repeat request process is indicated through a first information domain of the downlink control information.

Alternatively, in response to the number of the candidate hybrid automatic repeat request feedback delay included in the hybrid automatic repeat request feedback delay set being equal to a first threshold, the hybrid automatic repeat request feedback delay corresponding to the hybrid automatic repeat request process is indicated through the first information domain of the downlink control information.

In the embodiment of the present disclosure, in response to a number of the hybrid automatic repeat request feedback delay included in the hybrid automatic repeat request feedback delay set being greater than the first threshold, a hybrid automatic repeat request feedback delay corresponding to a hybrid automatic repeat request process is indicated through a second information domain of the downlink control information.

Alternatively, in response to the number of the hybrid automatic repeat request feedback delay included in the hybrid automatic repeat request feedback delay set being equal to the first threshold, the hybrid automatic repeat request feedback delay corresponding to the hybrid automatic repeat request process is indicated through the second information domain of the downlink control information.

In some embodiments of the present disclosure, the first determination module 101 is configured to: determine, in response to the terminal being configured with a scheduling enhancement function, at least one hybrid automatic repeat request feedback delay set according to one or more hybrid automatic repeat request feedback delay sets corresponding to the scheduling enhancement function;

or, determine at least one hybrid automatic repeat request feedback delay set according to one or more candidate hybrid automatic repeat request feedback delays corresponding to the scheduling enhancement function.

In the embodiment of the present disclosure, the first determination module 101 is configured to: determine, in response to the terminal being configured with a scheduling enhancement function, at least one hybrid automatic repeat request feedback delay set according to one or more hybrid automatic repeat request feedback delay sets corresponding to the scheduling enhancement function and corresponding to the specified number of hybrid automatic repeat request feedback;

or, determine at least one hybrid automatic repeat request feedback delay set according to one or more hybrid automatic repeat request feedback delays corresponding to the scheduling enhancement function and corresponding to the specified number of hybrid automatic repeat request feedback.

In some embodiments of the present disclosure, there is more than one hybrid automatic repeat request feedback delay set, where more than one different hybrid automatic repeat request feedback delay set is completely different or are not exactly the same.

In some embodiments of the present disclosure, more than one different hybrid automatic repeat request feedback delay set is configured by the network side, or determined based on the pre-configuration information, or determined based on the communication protocol, or determined by negotiation between the base station and the UE.

With regard to the apparatus in the above embodiments, the specific manner in which each module performs an operation has been described in detail in some embodiments related to the method, and will not be described in detail here.

Figure 4:
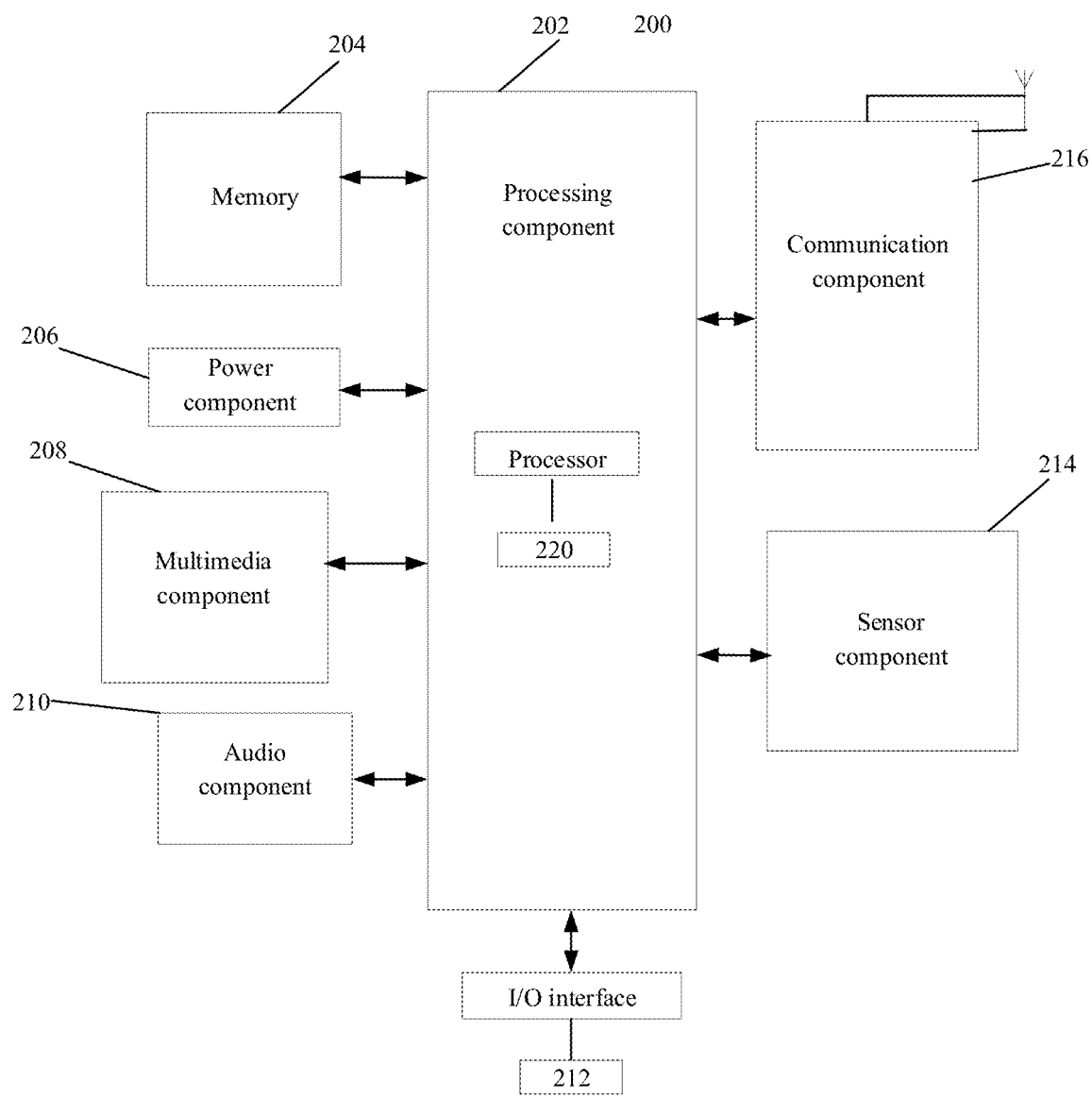
FIG. 4 is a block diagram of another apparatus for communication according to an embodiment.

FIG. 4 is a block diagram of an apparatus 200 for communication according to an embodiment. For example, the apparatus 200 may be a mobile phone, a computer, a digital broadcast terminal, a messaging device, a game console, a tablet device, a medical device, an exercise device, a personal digital assistant, etc.

Referring to FIG. 4, the apparatus 200 may include one or more of the following components: a processing component 202, a memory 204, a power component 206, a multimedia component 208, an audio component 210, an input/output (I/O) interface 212, a sensor component 214, and a communication component 216.

The processing component 202 generally controls the overall operation of the apparatus 200, such as operations associated with display, telephone calls, data communications, camera operations, and recording operations. The processing component 202 may include one or more processors 220 to execute instructions to complete all or part of the steps of the methods described above. In addition, the processing component 202 may include one or more modules that facilitate interaction between the processing component 202 and other components. For example, the processing component 202 may include a multimedia module to facilitate interaction between the multimedia component 208 and the processing component 202.

The memory 204 is configured to store various types of data to support operation at the apparatus 200. Examples of such data include instructions for any application or method operating on device 200, contact data, phonebook data, messages, pictures, videos, and the like. The memory 204 may be implemented by any type of volatile or non-volatile storage device or a combination of them, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 206 provides power to various components of the apparatus 200. Power component 206 may include a power management system, one or more power sources, and other components associated with generating, managing, and distributing power for apparatus 200.

The multimedia component 208 includes a screen providing an output interface between the apparatus 200 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touches, sliding, and gestures on the touch panel. The touch sensor may not only sense a boundary of a touch or swipe action, but also detect a duration and pressure associated with the touch or swipe action. In some embodiments, the multimedia component 208 includes a front-facing camera and/or a rear-facing camera. When the apparatus 200 is in an operation mode, such as a photographing mode or a video mode, the front-facing camera and/or the rear-facing camera may receive external multimedia data. Each of the front camera and the rear camera may be a fixed optical lens system or have a focal length and an optical zoom capability.

The audio component 210 is configured to output and/or input an audio signal. For example, the audio component 210 includes a microphone (MIC) configured to receive an external audio signal when the apparatus 200 is in an operating mode, such as a call mode, a recording mode, and a speech recognition mode. The received audio signal may be further stored in the memory 204 or transmitted via the communication component 216. In some embodiments, the audio component 210 further includes a speaker configured to output an audio signal.

The I/O interface 212 provides an interface between the processing component 202 and a peripheral interface module, and the peripheral interface module may be a keyboard, a click wheel, a button, or the like. The button may include, but are not limited to, a home button, a volume button, a start button, and a lock button.

The sensor assembly 214 includes one or more sensors for providing status assessments of various aspects for the apparatus 200. For example, the sensor assembly 214 may detect the open/closed state of the apparatus 200, the relative positioning of the components, such as the components being the display and the keypad of the apparatus 200, the sensor assembly 214 may also detect a position change of the apparatus 200 or a component of the apparatus 200, the presence or absence of the user in contact with the apparatus 200, the orientation or acceleration/deceleration of the apparatus 200, and the temperature change of the apparatus 200. The sensor assembly 214 may include a proximity sensor configured to detect the presence of nearby objects without any physical contact. The sensor assembly 214 may also include a light sensor, such as a CMOS or CCD image sensor, for use in an imaging application. In some embodiments, the sensor assembly 214 may further include an acceleration sensor, a gyroscope sensor, a magnetic sensor, a pressure sensor, or a temperature sensor.

The communication component 216 is configured to facilitate wired or wireless communication between the apparatus 200 and other devices. The apparatus 200 may access a wireless network based on a communication standard, such as WiFi, 2G, or 3G, or a combination of them. In some embodiments, communication component 216 receives broadcast signals or broadcast related information from an external broadcast management system via a broadcast channel. In some embodiments, the communication component 216 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 200 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components for performing the methods described above.

In some embodiments, there is further provided a non-transitory computer-readable storage medium including an instruction, for example, a memory 204 including an instruction, which may be executed by the processor 220 of the apparatus 200 to complete the foregoing method. For example, the non-transitory computer-readable storage medium may be a ROM, a random access memory (RAM), a CD-ROM, a magnetic tape, a floppy disk, an optical data storage device, etc.

Figure 5:
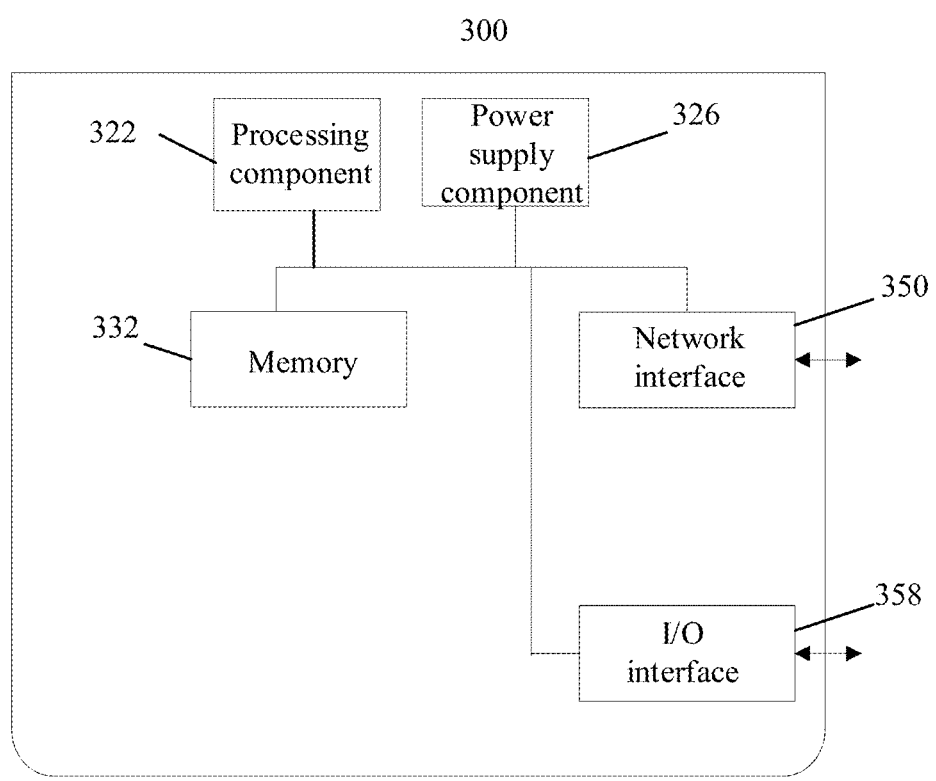
FIG. 5 is a block diagram of still another apparatus for communication according to an embodiment.

FIG. 5 is a block diagram of an apparatus 300 for communication, according to an embodiment. For example, the apparatus 300 may be provided as a server. Referring to FIG. 5, the apparatus 300 includes a processing component 322 that further includes one or more processors, and memory resource represented by the memory 332 for storing an instruction executable by the processing component 322, such as an application. The application stored in the memory 332 may include one or more modules each corresponding to a set of instructions. In addition, the processing component 322 is configured to execute the instruction to execute the indication performed by the network side in the method for communication.

The apparatus 300 may also include a power supply component 326 configured to perform power management of the apparatus 300, one wired or wireless network interface 350 configured to connect the apparatus 300 to a network, and an input-output (I/O) interface 358. The apparatus 300 may operate based on an operating system stored in the memory 332, such as Windows Server™, Mac OS X™, Unix™, Linux™, FreeBSD™, or the like.

In order to overcome the problems existing in the related art, there is provided a method for communication, an apparatus for communication, and a storage medium in the present disclosure.

According to a first aspect of some embodiments of the present disclosure, there is provided a method for communication, applied to a terminal, including:

determining, in response to the terminal being configured with a first transmission configuration, a hybrid automatic repeat request feedback delay set; where the hybrid automatic repeat request feedback delay set includes at least one candidate hybrid automatic repeat request feedback delay; and determining a hybrid automatic repeat request feedback delay corresponding to the first transmission configuration based on the hybrid automatic repeat request feedback delay set; where the first transmission configuration is a first number of hybrid automatic repeat request process or a transmission configuration associated with a first number of hybrid automatic repeat request.

In an embodiment, in response to a number of the candidate hybrid automatic repeat request feedback delay included in the hybrid automatic repeat request feedback delay set being less than a first threshold, a hybrid automatic repeat request feedback delay corresponding to a hybrid automatic repeat request process is indicated through a first information domain of downlink control information;

or in response to the number of the candidate hybrid automatic repeat request feedback delay included in the hybrid automatic repeat request feedback delay set being equal to the first threshold, the hybrid automatic repeat request feedback delay corresponding to the hybrid automatic repeat request process is indicated through the first information domain of the downlink control information.

In an embodiment, in response to a number of the candidate hybrid automatic repeat request feedback delay included in the hybrid automatic repeat request feedback delay set being greater than a first threshold, a hybrid automatic repeat request feedback delay corresponding to a hybrid automatic repeat request process is indicated through a second information domain of downlink control information;

or in response to the number of the candidate hybrid automatic repeat request feedback delay included in the hybrid automatic repeat request feedback delay set being equal to the first threshold, the hybrid automatic repeat request feedback delay corresponding to the hybrid automatic repeat request process is indicated through the second information domain of the downlink control information.

In an embodiment, the determining the hybrid automatic repeat request feedback delay set includes:
determining, in response to the terminal being configured with a scheduling enhancement function, at least one hybrid automatic repeat request feedback delay set according to one or more hybrid automatic repeat request feedback delay sets corresponding to the scheduling enhancement function;
or
determining at least one hybrid automatic repeat request feedback delay set according to one or more candidate hybrid automatic repeat request feedback delays corresponding to the scheduling enhancement function.

In an embodiment, the determining the hybrid automatic repeat request feedback delay set includes:
determining, in response to the terminal being configured with a scheduling enhancement function, at least one hybrid automatic repeat request feedback delay set according to one or more hybrid automatic repeat request feedback delay sets corresponding to the scheduling enhancement function and corresponding to a specified number of hybrid automatic repeat request feedback;
or
determining at least one hybrid automatic repeat request feedback delay set according to one or more hybrid automatic repeat request feedback delays corresponding to the scheduling enhancement function and corresponding to the specified number of hybrid automatic repeat request feedback.

In an embodiment, a number of the hybrid automatic repeat request feedback delay set is more than one, and more than one different hybrid automatic repeat request feedback delay set is completely different or not exactly the same.

In an embodiment, the more than one different hybrid automatic repeat request feedback delay set is configured by a network side, or determined based on pre-configuration information, or determined based on a communication protocol, or determined by negotiation between a base station and a UE.

According to a second aspect of some embodiments of the present disclosure, there is provided an apparatus for communication, including:
a first determination module, configured to determine, in response to the terminal being configured with a first transmission configuration, a hybrid automatic repeat request feedback delay set; where the hybrid automatic repeat request feedback delay set includes at least one candidate hybrid automatic repeat request feedback delay; and a second determination module, configured to determine a hybrid automatic repeat request feedback delay corresponding to the first transmission configuration based on the hybrid automatic repeat request feedback delay set; where the first transmission configuration is a first number of hybrid automatic repeat request process or a transmission configuration associated with a first number of hybrid automatic repeat request.

In an embodiment, in response to a number of the candidate hybrid automatic repeat request feedback delay included in the hybrid automatic repeat request feedback delay set being less than a first threshold, a hybrid automatic repeat request feedback delay corresponding to a hybrid automatic repeat request process is indicated through a first information domain of downlink control information;
or
in response to the number of the candidate hybrid automatic repeat request feedback delay included in the hybrid automatic repeat request feedback delay set being equal to the first threshold, the hybrid automatic repeat request feedback delay corresponding to the hybrid automatic repeat request process is indicated through the first information domain of the downlink control information.

In an embodiment, in response to a number of the candidate hybrid automatic repeat request feedback delay included in the hybrid automatic repeat request feedback delay set being greater than a first threshold, a hybrid automatic repeat request feedback delay corresponding to a hybrid automatic repeat request process is indicated through a second information domain of downlink control information;
or
in response to the number of the candidate hybrid automatic repeat request feedback delay included in the hybrid automatic repeat request feedback delay set being equal to the first threshold, the hybrid automatic repeat request feedback delay corresponding to the hybrid automatic repeat request process is indicated through the second information domain of the downlink control information.

In an embodiment, the first determination module is configured to:
determine, in response to the terminal being configured with a scheduling enhancement function, at least one hybrid automatic repeat request feedback delay set according to one or more hybrid automatic repeat request feedback delay sets corresponding to the scheduling enhancement function;
or
determine at least one hybrid automatic repeat request feedback delay set according to one or more candidate hybrid automatic repeat request feedback delays corresponding to the scheduling enhancement function.

In an embodiment, the first determination module is configured to:
determine, in response to the terminal being configured with a scheduling enhancement function, at least one hybrid automatic repeat request feedback delay set according to one or more hybrid automatic repeat request feedback delay sets corresponding to the scheduling enhancement function and corresponding to a specified number of hybrid automatic repeat request feedback;
or
determine at least one hybrid automatic repeat request feedback delay set according to one or more hybrid automatic repeat request feedback delays corresponding to the scheduling enhancement function and corresponding to the specified number of hybrid automatic repeat request feedback.

In an embodiment, a number of the hybrid automatic repeat request feedback delay set is more than one, and more than one different hybrid automatic repeat request feedback delay set is completely different or not exactly the same.

In an embodiment, the more than one different hybrid automatic repeat request feedback delay set is configured by a network side, or determined based on pre-configuration information, or determined based on a communication protocol, or determined by negotiation between a base station and a UE.

According to a third aspect of some embodiments of the present disclosure, there is provided an apparatus for communication, including:
a processor; and a memory configured to store with an instruction executable by the processor; where the processor is configured to perform the method for communication according to any embodiment of the first aspect or the first aspect.

According to a fourth aspect of some embodiments of the present disclosure, there is provided a non-transitory computer-readable storage medium, and when an instruction in the storage medium is executed by a processor of a terminal, the terminal is enabled to perform the method for communication according to any embodiment of the first aspect or the first aspect.

The present disclosure may include the following beneficial effects: by determining the hybrid automatic repeat request feedback delay set corresponding to the function configured by the terminal, the hybrid automatic repeat request feedback delay supported by the terminal in the hybrid automatic repeat request feedback delay set is further determined, thus achieving flexible use of the hybrid automatic repeat request feedback delay, and satisfying the needs of different hybrid automatic repeat request feedback delays when the terminal supports different numbers of hybrid automatic repeat request processes.

It is further understood that in the present disclosure, "more than one" refers to two or more, and other quantifiers are similar. "And/or" describes the association relationship of associated objects, indicating that there can be three kinds of relationships, for example, A and/or B, which can indicate that there are three cases: A existing alone, A and B existing simultaneously, and B existing alone. The character "/" generally indicates that the associated object is an "or" relationship. The "one", "said" and "the" in the singular form are also intended to include the majority, unless the context clearly indicates otherwise.

It is further understood that the terms "first" and "second" are used to describe various kinds of information, but the information should not be limited to these terms. These terms are used to distinguish the same type of information from each other, and do not indicate a specific order or importance. In fact, the expressions "first" and "second" can be used interchangeably. For example, without departing from the scope of the present disclosure, the first information can also be called the second information, and similarly, the second information can also be called the first information.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

It is further understood that in some embodiments of the present disclosure, although the operations are described in a specific order in the attached drawings, it should not be understood as needing these operations to be performed in the specific order or serial order shown, or all the operations shown to be performed to obtain the desired results. In a specific environment, multitasking and parallel processing may be beneficial.

After considering the description and practicing the invention disclosed here, those skilled in the art will easily think of other embodiments of the present disclosure. The present application is intended to cover any variant, use or adaptive change of the present disclosure. These variants, uses or adaptive changes follow the general principles of the present disclosure and include the common knowledge or commonly used technical means in the technical field not disclosed in the present disclosure. The description and the embodiments are regarded as illustrative. The true scope and spirit of the present disclosure are indicated by the following claims.

It should be understood that the present disclosure is not limited to the precise structure described above and shown in the drawings, and various modifications and changes can be made without departing from its scope. The scope of the present disclosure is limited only by the appended claims.

What is claimed is:

1. A method for communication, comprising:
determining, by a terminal, in response to the terminal being configured with a first transmission configuration, a hybrid automatic repeat request feedback delay set; wherein the hybrid automatic repeat request feedback delay set comprises at least one candidate hybrid automatic repeat request feedback delay; and
determining, by the terminal, a hybrid automatic repeat request feedback delay corresponding to the first transmission configuration based on the hybrid automatic repeat request feedback delay set;
wherein the first transmission configuration is a first number of hybrid automatic repeat request process or a transmission configuration associated with a first number of hybrid automatic repeat request;
in response to a number of the candidate hybrid automatic repeat request feedback delay comprised in the hybrid automatic repeat request feedback delay set being less than a first threshold, a hybrid automatic repeat request feedback delay corresponding to a hybrid automatic repeat request process is indicated through a first information domain of downlink control information;
in response to the number of the candidate hybrid automatic repeat request feedback delay comprised in the hybrid automatic repeat request feedback delay set being greater than the first threshold, the hybrid automatic repeat request feedback delay corresponding to the hybrid automatic repeat request process is indicated through a second information domain of downlink control information; and
bits comprised in the first information domain are different form bits comprised in the second information domain.

2. The method for communication according to claim 1, wherein the determining the hybrid automatic repeat request feedback delay set comprises:
determining, in response to the terminal being configured with a scheduling enhancement function, at least one hybrid automatic repeat request feedback delay set according to one or more hybrid automatic repeat request feedback delay sets corresponding to the scheduling enhancement function.

3. The method for communication according to claim 1, wherein the determining the hybrid automatic repeat request feedback delay set comprises:
determining, in response to the terminal being configured with a scheduling enhancement function, at least one hybrid automatic repeat request feedback delay set according to one or more hybrid automatic repeat request feedback delay sets corresponding to the scheduling enhancement function and corresponding to a specified number of hybrid automatic repeat request feedback.

4. The method for communication according to claim 1, wherein a number of the hybrid automatic repeat request feedback delay set is more than one, and more than one different hybrid automatic repeat request feedback delay set are completely different or not exactly the same.

5. The method for communication according to claim 4, wherein the more than one different hybrid automatic repeat request feedback delay set are configured by a network side.

6. The method for communication according to claim 4, wherein the more than one different hybrid automatic repeat request feedback delay set is determined based on at least one of: pre-configuration information, a communication protocol, or negotiation between a base station and a UE.

7. The method for communication according to claim 1, wherein, in response to the number of the candidate hybrid automatic repeat request feedback delay comprised in the hybrid automatic repeat request feedback delay set being equal to the first threshold, the hybrid automatic repeat request feedback delay corresponding to the hybrid automatic repeat request process is indicated through the first information domain of downlink control information.

8. The method for communication according to claim 1, wherein, in response to the number of the candidate hybrid automatic repeat request feedback delay comprised in the hybrid automatic repeat request feedback delay set being equal to the first threshold, the hybrid automatic repeat request feedback delay corresponding to the hybrid automatic repeat request process is indicated through the second information domain of downlink control information.

9. The method for communication according to claim 1, wherein the determining the hybrid automatic repeat request feedback delay set comprises:
determining, in response to the terminal being configured with a scheduling enhancement function, at least one hybrid automatic repeat request feedback delay set according to one or more candidate hybrid automatic repeat request feedback delays corresponding to the scheduling enhancement function.

10. The method for communication according to claim 1, wherein the determining the hybrid automatic repeat request feedback delay set comprises:
determining, in response to the terminal being configured with a scheduling enhancement function, at least one hybrid automatic repeat request feedback delay set according to one or more hybrid automatic repeat request feedback delays corresponding to the scheduling enhancement function and corresponding to a specified number of hybrid automatic repeat request feedback.

11. An apparatus for communication, comprising:
a processor;
a memory, configured to store with an instruction executable by the processor;
wherein the processor is configured to:
determine, in response to the terminal being configured with a first transmission configuration, a hybrid automatic repeat request feedback delay set; wherein the hybrid automatic repeat request feedback delay set comprises at least one candidate hybrid automatic repeat request feedback delay; and
determine a hybrid automatic repeat request feedback delay corresponding to the first transmission configuration based on the hybrid automatic repeat request feedback delay set;
wherein the first transmission configuration is a first number of hybrid automatic repeat request process or a transmission configuration associated with a first number of hybrid automatic repeat request;
in response to a number of the candidate hybrid automatic repeat request feedback delay comprised in the hybrid automatic repeat request feedback delay set being less than a first threshold, a hybrid automatic repeat request feedback delay corresponding to a hybrid automatic repeat request process is indicated through a first information domain of downlink control information;
in response to the number of the candidate hybrid automatic repeat request feedback delay comprised in the hybrid automatic repeat request feedback delay set being greater than the first threshold, the hybrid automatic repeat request feedback delay corresponding to the hybrid automatic repeat request process is indicated through a second information domain of downlink control information; and
bits comprised in the first information domain are different form bits comprised in the second information domain.

12. The apparatus for communication according to claim 11, wherein, in response to the number of the candidate hybrid automatic repeat request feedback delay comprised in the hybrid automatic repeat request feedback delay set being equal to the first threshold, the hybrid automatic repeat request feedback delay corresponding to the hybrid automatic repeat request process is indicated through the first information domain of downlink control information.

13. The apparatus for communication according to claim 11, wherein, in response to the number of the candidate hybrid automatic repeat request feedback delay comprised in the hybrid automatic repeat request feedback delay set being equal to the first threshold, the hybrid automatic repeat request feedback delay corresponding to the hybrid automatic repeat request process is indicated through the second information domain of downlink control information.

14. The apparatus for communication according to claim 11, wherein the processor is further configured to:
determine, in response to the terminal being configured with a scheduling enhancement function, at least one hybrid automatic repeat request feedback delay set according to one or more hybrid automatic repeat request feedback delay sets corresponding to the scheduling enhancement function.

15. The apparatus for communication according to claim 11, wherein the processor is further configured to:
determine, in response to the terminal being configured with a scheduling enhancement function, at least one hybrid automatic repeat request feedback delay set according to one or more hybrid automatic repeat request feedback delay sets corresponding to the scheduling enhancement function and corresponding to a specified number of hybrid automatic repeat request feedback.

16. A non-transitory computer-readable storage medium, wherein when an instruction in the storage medium is executed by a processor of a terminal, the terminal is enabled to perform a method for communication comprising:

determining, in response to the terminal being configured with a first transmission configuration, a hybrid automatic repeat request feedback delay set; wherein the hybrid automatic repeat request feedback delay set comprises at least one candidate hybrid automatic repeat request feedback delay; and determining a hybrid automatic repeat request feedback delay corresponding to the first transmission configuration based on the hybrid automatic repeat request feedback delay set;

wherein the first transmission configuration is a first number of hybrid automatic repeat request process or a transmission configuration associated with a first number of hybrid automatic repeat request;

in response to a number of the candidate hybrid automatic repeat request feedback delay comprised in the hybrid automatic repeat request feedback delay set being less than a first threshold, a hybrid automatic repeat request feedback delay corresponding to a hybrid automatic repeat request process is indicated through a first information domain of downlink control information;

in response to the number of the candidate hybrid automatic repeat request feedback delay comprised in the hybrid automatic repeat request feedback delay set being greater than the first threshold, the hybrid automatic repeat request feedback delay corresponding to the hybrid automatic repeat request process is indicated through a second information domain of downlink control information; and bits comprised in the first information domain are different form bits comprised in the second information domain.

* * * * *